United States Patent [19]

Draoui

[11] Patent Number: 5,277,061
[45] Date of Patent: Jan. 11, 1994

[54] METHOD FOR DETERMINING THE ROTATION SPEED OF A DRILL BIT

[75] Inventor: Elyes Draoui, Pau, France

[73] Assignee: Societe Nationale Elf Aquitaine (Production), France

[21] Appl. No.: 849,361

[22] PCT Filed: Aug. 30, 1991

[86] PCT No.: PCT/FR91/00699
§ 371 Date: Apr. 29, 1992
§ 102(e) Date: Apr. 29, 1992

[87] PCT Pub. No.: WO92/04527
PCT Pub. Date: Mar. 19, 1992

[30] Foreign Application Priority Data

Sep. 4, 1990 [FR] France .................. 90 10971

[51] Int. Cl.$^5$ .................................... E21B 47/00
[52] U.S. Cl. .................................. 73/151; 175/40
[58] Field of Search .................. 73/151; 175/40

[56] References Cited

U.S. PATENT DOCUMENTS

| | | | |
|---|---|---|---|
| 2,985,829 | 9/1957 | Swift | 324/70 |
| 3,693,460 | 9/1972 | Saadeh | 73/516 |
| 3,789,935 | 2/1074 | Saadeh | 175/40 |
| 4,065,975 | 1/1978 | Giessner | 73/510 |
| 4,697,650 | 10/1987 | Fontenot | 73/151 |
| 4,783,742 | 11/1988 | Peters | 73/151 |
| 4,958,125 | 9/1990 | Jardine et al. | 73/151 |
| 5,159,577 | 10/1992 | Twist | 73/151 |

Primary Examiner—Robert J. Warden
Assistant Examiner—Hien Tran
Attorney, Agent, or Firm—Bacon & Thomas

[57] ABSTRACT

A method for determining the rotation speed of the drill bit arranged at one end of a rotating drill string. According to the method, the axial acceleration at one point on the drill string is measured, this measurement is processed with a multiplying coefficient which depends upon the point on the drill string where the measurement is taken to determine the rotational speed of the drill bit.

5 Claims, 3 Drawing Sheets

FIG_1

METHOD FOR DETERMINING THE ROTATION SPEED OF A DRILL BIT

BACKGROUND OF THE INVENTION

The present invention relates to a method for determining the rotation speed of a drill bit, and, more particularly, to such a method intended to determine this speed in real time from data captured at one point of the string.

During the drilling of an oil well, the motor unit for the string of pipe, which motor unit is mounted on the surface, rotates at a constant speed of between 50 and 150 revolutions per minute. However, the friction produced between the drill bit and the bottom of the well, or between the pipes and the wall of the well, may cause the bit to slow down or indeed to stop periodically. As during this time, the motor unit continues to rotate at one end of the string of pipe, the latter tends to twist about its longitudinal axis until the force exerted is greater than the friction effect braking the bit. At that moment, the string of pipe relaxes and the bit starts to rotate again and can reach point rotation speeds of the order of 150 to 400 revolutions per minute. As wells often follow deviated trajectories, contact between the string and the wall of the well occurs quite frequently.

It is obvious that the behaviour of the bit has a significant effect on the progress of the drilling. Thus, it is desirable for the head driller to be alerted to periodic rotation-speed instabilities of the bit in order that he can modify the parameters of the drillingrotation speed of the motor unit, mud flow rate or weight applied to the tool—and thus to ensure optimal drilling.

SUMMARY OF THE INVENTION

The subject of the present invention is therefore a method for determining the rotation speed of a drill bit, capable of being performed in real time from data captured at one point of the string.

In order to achieve this, the invention provides a method for determining the rotation speed of a drill bit, the bit being disposed at one end of a drill string, the other end of the string being set into rotation, characterized in that the method comprises the following steps:

measurement of the axial acceleration at one point of the string, processing of this measurement in order to determine the energy content of the acceleration, application of a correction to this energy value in order determine the rotation speed.

BRIEF DESCRIPTION OF THE DRAWINGS

Other characteristics and advantages of the present invention will emerge more clearly on reading the description hereinbelow with reference to the attached drawings, in which.

DETAILED DESCRIPTION OF PREFERRED EMBODIMENTS

Figure 1:
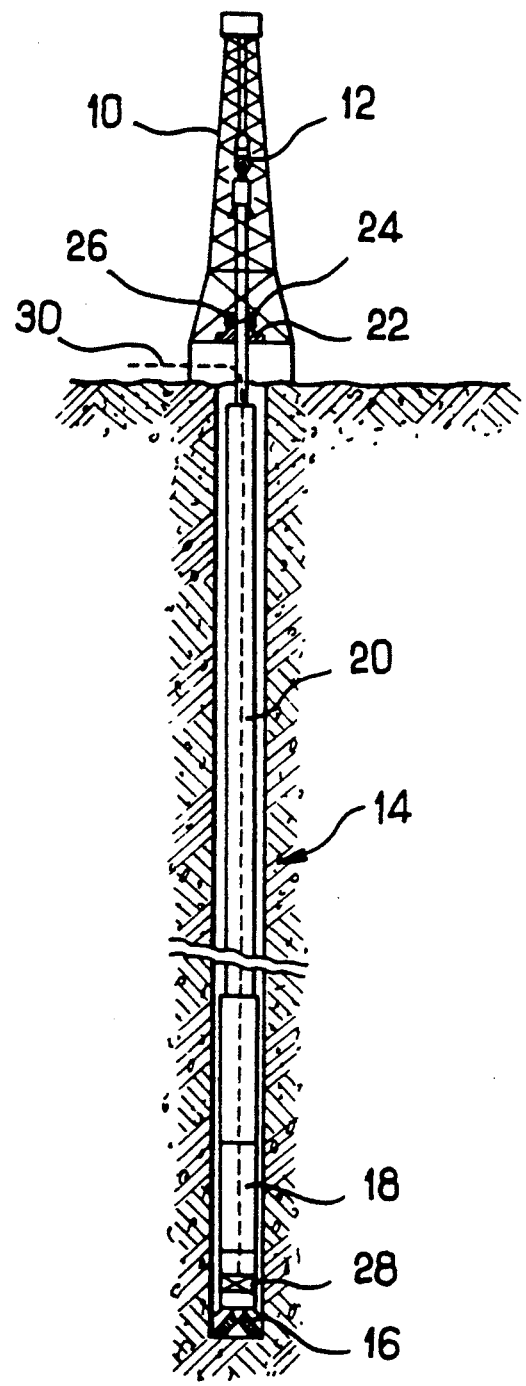
FIG. 1 is a diagrammatic sectional view of a drilling assembly.

As shown in FIG. 1, a drilling assembly comprises a mast 10 fitted, in a manner known per se, with a hook 12 to which is suspended a string of pipe, represented generally by 14. The string of pipe 14 comprises a drill bit 16, drill collars 18 and drill pipes 20 forming an assembly called the drill string. In the example illustrated, the string of pipe 14 is set into rotation by a rotary turntable 22. The string of pipe 14 is fitted with an accelerometer 24 and a rotation-speed sensor 26.

In a first embodiment of the invention, the rotation speed of the bit 16 is determined from the acceleration of the bit, which acceleration is measured at the bottom of the well. It should be recalled that the devices for measuring the rotation speed of the bit, which are intended to be installed adjacent to the drill collars 18, are very complicated and bulky, whereas an accelerometer is generally of simple construction and simple operation. Thus, according to this first embodiment, an accelerometer 28 is mounted adjacent to the drill collars 18 and comprises a channel 30 for transmitting the data to the surface.

Figure 2:
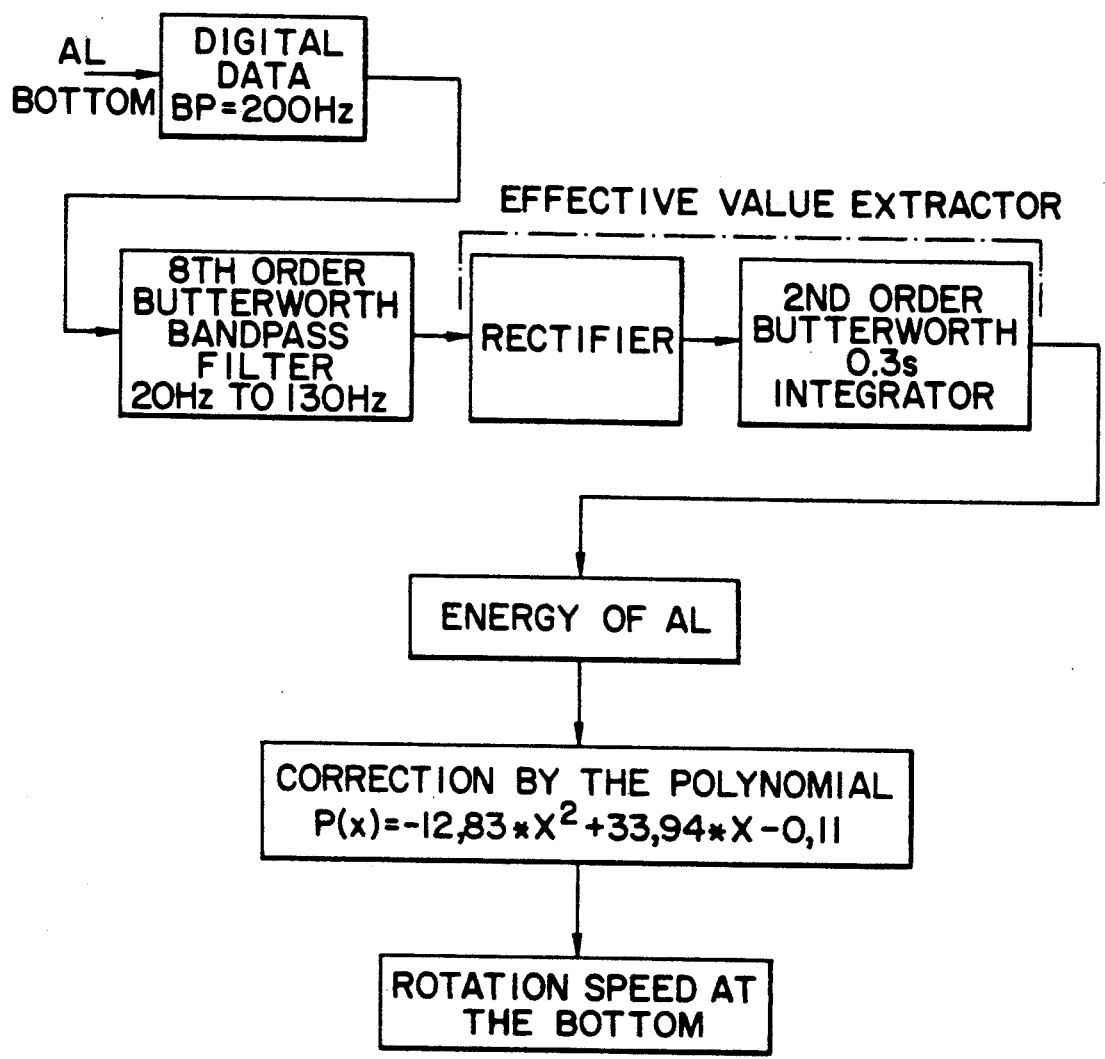
FIGS. 2 and 3 show, in block diagram form, the steps of the method according to the present invention.

Once the data representing the axial acceleration of the bit 16 have arrived at the surface, it is necessary to process them in order to determine the rotation speed of the bit. In FIG. 2 are shown the steps of the processing of the data.

In a first step, the axial acceleration data are filtered a band pass filter in order to allow only frequencies lying between 20 and 130 Hz. The data then pass via a rectifier and an integrator in order to be able to determine the energy of the axial acceleration. The value of the axial acceleration energy is then corrected by applying the following polynomial in order to be able to determine the rotation speed at the bottom.

$$P(X) = -12.83 \cdot X^2 + 33.94 \cdot X - 0.11$$

Thus, from the axial accelerations of the tool which are measured at the bottom of the well, it is possible, according to the invention, to calculate the rotation speed of the bit.

Nevertheless, the present invention enables, in a second embodiment, to determine the rotation speed of the bit from measurements of the axial acceleration of the string taken at the surface.

The processing of the measurements taken from the axial accelerations of the string at the surface requires a knowledge of the attenuation factor of the axial vibration energy in the string between the bit and the surface The data of the problem are the following:

| Y? | POL |
|---|---|
| $POL(X) = a \cdot X^2 + b \cdot X + c$ | $As \longrightarrow Af \longrightarrow Vf$ |

(1) HYPOTHESIS : Y amplifier
(2) CONSTRAINT : average (Vs) = average (Vf)
(3) UNKNOWN : Coefficient Y
(4) Y × As = Af
(5) POL (Af) = Vf Notations :

Vf : rotation speed at the bottom
Vs : rotation speed at the surface
As : energy of the axial acceleration at the surface
Af : energy of the axial acceleration at the bottom.

The solution to the problem is carried out as follows:

EQUATIONS (5) $\longrightarrow a \cdot Af^2 + b \cdot Af + c = Vf$
(4) $\longrightarrow Y \cdot As = Af$
(2) $\longrightarrow avg(Vs) = avg(Vf)$

SOLUTION (5) $\longrightarrow avg(a \cdot Af^2 + b \cdot Af + c) = avg(Vf)$
(5)'
$a \cdot avg(As)^2 \cdot Y^2 + b \cdot avg(As) \cdot Y + c = avg(Vs)$
(5)' + (4) + (2)

-continued

| Equation of the second degree in Y. |
| --- |

Solution of the equation in order to obtain the amplifier coefficient: only one of the two solutions is physically valid.

Figure 3:
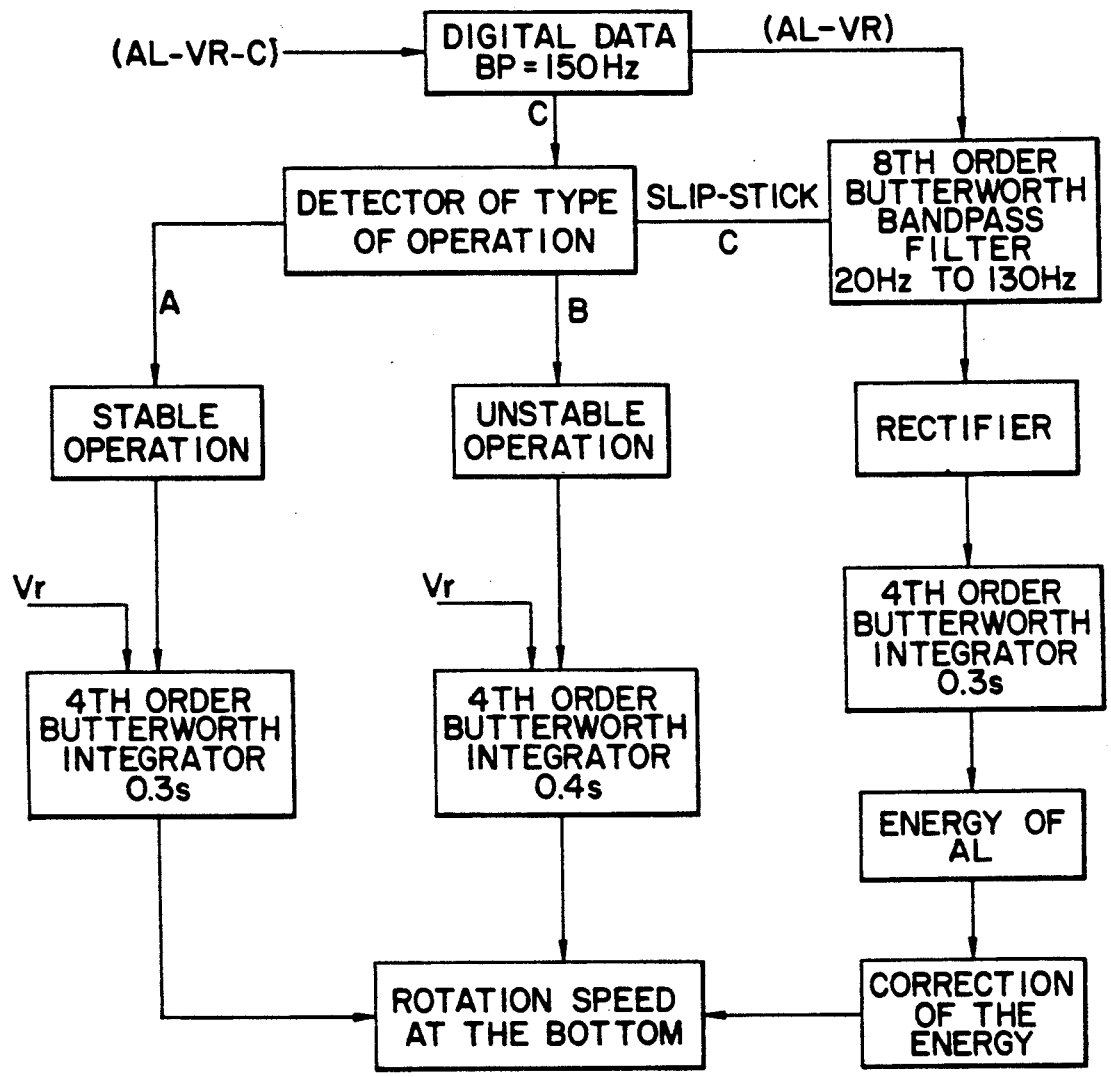

In FIG. 3 are shown the various steps of the processing of the data.

First of all, it is advisable to determine the type of operation of the bit. There are three possible cases. Either the bit 16 rotates freely at a speed similar to that of the rotary turntable 22, a situation called stable operation. In a second case, the friction between the bit and the bottom of the well, or between the string and the internal wall of the well, may cause, in a known manner, the rotation of the bit to slow down irregularly. This situation is called unstable operation. In the final case, the string undergoes periodic rotation instabilities, more commonly called "Stick Slip". These three types of operation are shown by the paths A, B and C respectively in FIG. 3.

In the case of periodic rotation instabilities, path C, the initial processing of the data is substantially similar to that of the first embodiment. As the measurement is performed at a point far from the bottom, it is necessary to apply a multiplying coefficient, which depends on the position of the point, in order to bring the data of the energy content back to the value of those taken at the bottom of the well.

I claim:

1. A method for determining the rotation speed of a drill bit in a well, the bit being disposed at one end of a drill string, the other end of the drill string being set into rotation, comprising the following steps:
    measuring an axial acceleration at an arbitrary point on a drill string; spaced away from the drill bit.
    determining a multiplying coefficient which depends on the position of the arbitrary point on the drill string in relation to the drill bit; and
    calculating an instantaneous rotation speed of the drill bit from said measured axial acceleration and multiplying coefficient.

2. The method according to claim 1, wherein said axial acceleration is measured at an upper end of the drill string.

3. The method according to claim 1, further comprising the step of detecting the type of operation of the drill string.

4. The method according to claim 1, wherein the step of measuring the axial acceleration includes band pass filtering.

5. The method according to claim 4, wherein said band pass filtering allows only frequencies lying between 20 and 130 Hz to pass.

* * * * *